US011332259B1

United States Patent
Samuthirapandian et al.

(10) Patent No.: US 11,332,259 B1
(45) Date of Patent: May 17, 2022

(54) SYSTEMS AND METHODS FOR PROVIDING LOCATION INFORMATION FOR A USER-SELECTED FEATURE ON AN ACTIVE VERTICAL SITUATION DISPLAY (VSD)

(71) Applicant: HONEYWELL INTERNATIONAL INC., Charlotte, NC (US)

(72) Inventors: Subash Samuthirapandian, Tirunelveli (IN); Ivan Wyatt, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/138,311

(22) Filed: Dec. 30, 2020

(30) Foreign Application Priority Data

Nov. 11, 2020 (IN) .............................. 202011049226

(51) Int. Cl.
| | |
|---|---|
| G06F 3/048 | (2013.01) |
| B64D 43/00 | (2006.01) |
| G01C 21/20 | (2006.01) |
| G08G 5/00 | (2006.01) |
| G06F 3/0482 | (2013.01) |

(52) U.S. Cl.
CPC ............ B64D 43/00 (2013.01); G01C 21/20 (2013.01); G06F 3/0482 (2013.01); G08G 5/0021 (2013.01)

(58) Field of Classification Search
CPC ....... B64D 43/00; G01C 21/20; G06F 3/0482; G08G 5/0021
See application file for complete search history.

(56) References Cited

U.S. PATENT DOCUMENTS

| | | |
|---|---|---|
| 6,389,355 B1 | 5/2002 | Gibbs et al. |
| 7,109,913 B1 | 9/2006 | Paramore et al. |
| 8,099,201 B1 | 1/2012 | Barber et al. |
| 8,519,997 B2 | 8/2013 | Suddreth et al. |

(Continued)

OTHER PUBLICATIONS

"CursorModifier," https://www.scichart.com/documentation/win/current/SciChart_WPF_SDK_User_Manual.html—SciChart WPF Charts (https://www.scichart.com/wpf-chart-features) SDK v6.x, downloaded from https://www.scichart.com/documentation/win/current/CursorModifier.html on Oct. 9, 2020.

(Continued)

*Primary Examiner* — Aleksey Olshannikov
(74) *Attorney, Agent, or Firm* — Lorenz & Kopf, LLP

(57) ABSTRACT

Methods and systems for providing location information for a user-selected feature on an active vertical situation display (VSD) in a cockpit of an aircraft. The method includes rendering the VSD having a plurality of terrain and weather features; receiving, from a user interface, the user-selected feature from among the plurality of features on the VSD, the plurality of features including terrain features and weather features; causing a reticle to be displayed as an overlay, centered, on the user-selected feature on the VSD, responsive to receiving the user-selected feature; rendering a horizontal extension from a center of the reticle to an intersection on a vertical axis of the VSD, and a vertical extension from the center of the reticle to an intersection on a horizontal axis of the VSD. An elevation label and a distance label are positioned on the respective extensions.

11 Claims, 4 Drawing Sheets

(56) References Cited

U.S. PATENT DOCUMENTS

| | | |
|---|---|---|
| 8,793,039 B1 | 7/2014 | Hammack et al. |
| 9,019,147 B1 | 4/2015 | Oranskiy et al. |
| 9,132,913 B1* | 9/2015 | Shapiro ................ G08G 5/0086 |
| 2004/0217883 A1* | 11/2004 | Judge ..................... G01C 23/00 |
| | | 340/946 |
| 2006/0005147 A1 | 1/2006 | Hammack et al. |
| 2010/0073359 A1 | 3/2010 | Suddreth et al. |
| 2010/0131126 A1 | 5/2010 | He et al. |
| 2012/0010765 A1 | 1/2012 | Wilson et al. |
| 2018/0074167 A1 | 3/2018 | Bilek et al. |
| 2018/0156633 A1* | 6/2018 | Fadden ................. G01C 21/20 |
| 2018/0268721 A1* | 9/2018 | McCullough ........ G08G 5/0021 |
| 2019/0279514 A1 | 9/2019 | Ramachandra et al. |

OTHER PUBLICATIONS

Extended European Search Report for Application No. 21205950.5 dated Mar. 31, 2022.

* cited by examiner

SYSTEMS AND METHODS FOR PROVIDING LOCATION INFORMATION FOR A USER-SELECTED FEATURE ON AN ACTIVE VERTICAL SITUATION DISPLAY (VSD)

CROSS REFERENCE TO RELATED APPLICATION

This application claims priority to Indian Provisional Patent Application No. 202011049226, filed Nov. 11, 2020, the entire content of which is incorporated by reference herein.

TECHNICAL FIELD

The following disclosure relates generally to aircraft display systems, and, more particularly, to systems and methods for providing location information for a user-selected feature on an active vertical situation display (VSD).

BACKGROUND

A Vertical Situation Display (VSD) on a cockpit provides a vertical profile of terrain, weather and a flight path trajectory if an aircraft follows the flight plan. If the aircraft doesn't follow the flight plan, the VSD can provide an along aircraft track angle for guidance.

Available implementations of VSDs provide a broad vertical view of weather, terrain and flight plan awareness. However, a technical problem is presented when a pilot wants to have additional detailed information, such as specific altitude, angle and distance measurements for a user-selected feature within a cluster or plurality of weather and terrain features on a VSD.

Accordingly, there is a need for flight display systems and methods for providing location information for a user-selected feature on an active vertical situation display (VSD). Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a flight display system for providing location information for a user-selected feature on an active vertical situation display (VSD) provided on a display unit in a cockpit of an aircraft. The flight display system includes a controller circuit configured to: receive, from a user interface operationally coupled to the controller circuit, the user-selected feature from among a plurality of features on the active VSD, the plurality of features including terrain features and weather features; cause a reticle to be displayed as an overlay, centered, on the user-selected feature on the active VSD, responsive to receiving the user-selected feature; render a first indicator showing a horizontal extension from a center of the reticle to an intersection on a vertical axis of the active VSD; render a second indicator showing a vertical extension from the center of the reticle to an intersection on a horizontal axis of the active VSD; reference map layer data using the center of the reticle to obtain raw geospatial information for the user-selected feature; convert the raw geospatial information for the user-selected feature to an elevation and a distance consistent with a current scale of the active VSD; position an alphanumeric elevation label along the first indicator; and position an alphanumeric distance label by the second indicator.

Also provided is an embodiment of a processor-implemented method for providing location information for a user-selected feature on an active vertical situation display (VSD) provided on a display unit in a cockpit of an aircraft. The method includes: rendering the active vertical situation display (VSD) having a plurality of features as a function of received aircraft state data, terrain data, and weather data; receiving, from a user interface, at a controller circuit, the user-selected feature from among the plurality of features on the active VSD, the plurality of features including terrain features and weather features; causing a reticle to be displayed as an overlay, centered, on the user-selected feature on the active VSD, responsive to receiving the user-selected feature; rendering a first indicator showing a horizontal extension from a center of the reticle to an intersection on a vertical axis of the active VSD; rendering a second indicator showing a vertical extension from the center of the reticle to an intersection on a horizontal axis of the active VSD; referencing map layer data using the center of the reticle to obtain raw geospatial information for the user-selected feature; converting the raw geospatial information for the user-selected feature to an elevation and a distance consistent with a current scale of the active VSD; positioning an alphanumeric elevation label along the first indicator; and positioning an alphanumeric distance label by the second indicator.

Also provided is another flight display system for providing location information for a user-selected feature on an active vertical situation display (VSD) provided on a display unit in a cockpit of an aircraft. The flight display system includes: a display unit configured to render the active VSD; and a controller circuit configured by programming instructions to: receive, from a user interface operationally coupled to the controller circuit, the user selected feature from among a plurality of features on the active VSD, the plurality of features including terrain features and weather features; cause a reticle to be displayed as an overlay, centered, on the user-selected feature on the active VSD, responsive to receiving the user-selected feature; render a first indicator showing a horizontal extension from a center of the reticle to an intersection on a vertical axis of the active VSD; render a second indicator showing a vertical extension from the center of the reticle to an intersection on a horizontal axis of the active VSD; reference map layer data using the center of the reticle to obtain raw geospatial information for the user-selected feature; convert the raw geospatial information for the user-selected feature to an elevation and a distance consistent with a current scale of the active VSD; position an alphanumeric elevation label along the first indicator; and position an alphanumeric distance label by the second indicator.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, available implementations of VSDs provide a broad vertical view of weather, terrain and flight plan awareness, but a technical problem is presented when a pilot wants to have additional detailed information, such as specific altitude, angle and distance measurements for a single feature within a cluster or plurality of weather and terrain features.

Being able to know an altitude and distance for a single weather feature enables a pilot for better strategic situational awareness and strategic flight planning. For example, when an aircraft is in an en-route phase of flight and severe weather is indicated on a VSD, understanding the vertical extension of the severe weather is important for pilot. Having access to more detailed information may enable the pilot to see an opportunity to avoid the severe weather element by flying below or above it.

Similarly, being able to know an elevation and distance for a single terrain feature enables a pilot for better strategic situational awareness and strategic flight planning. For example, when a terrain peak is displayed on a VSD, understanding the terrain elevation and its specific angle from the aircraft's track is important to avoid it.

The present disclosure provides a technical solution, in the form of flight display systems and methods for providing location information for a user-selected feature on an active vertical situation display (VSD) provided on a display device in a cockpit of an aircraft. The flight display system may be onboard the aircraft of part of an electronic flight bag (EFB) or another portable electronic device.

The present disclosure provides an added level of specificity for the user selection, with a reticle. An advantage to using a reticle, such as a crosshair design, is a reduction in the ambiguity of available solutions, in which a distance to the cursor is dependent on a mode. In the provided embodiments using the reticle, the distance from the aircraft to the user-selected feature located at the geometric center of the reticle is displayed along the range scale (i.e., the X axis, or horizontal axis, of the VSD) so the measurement is readily apparent.

Figure 1:
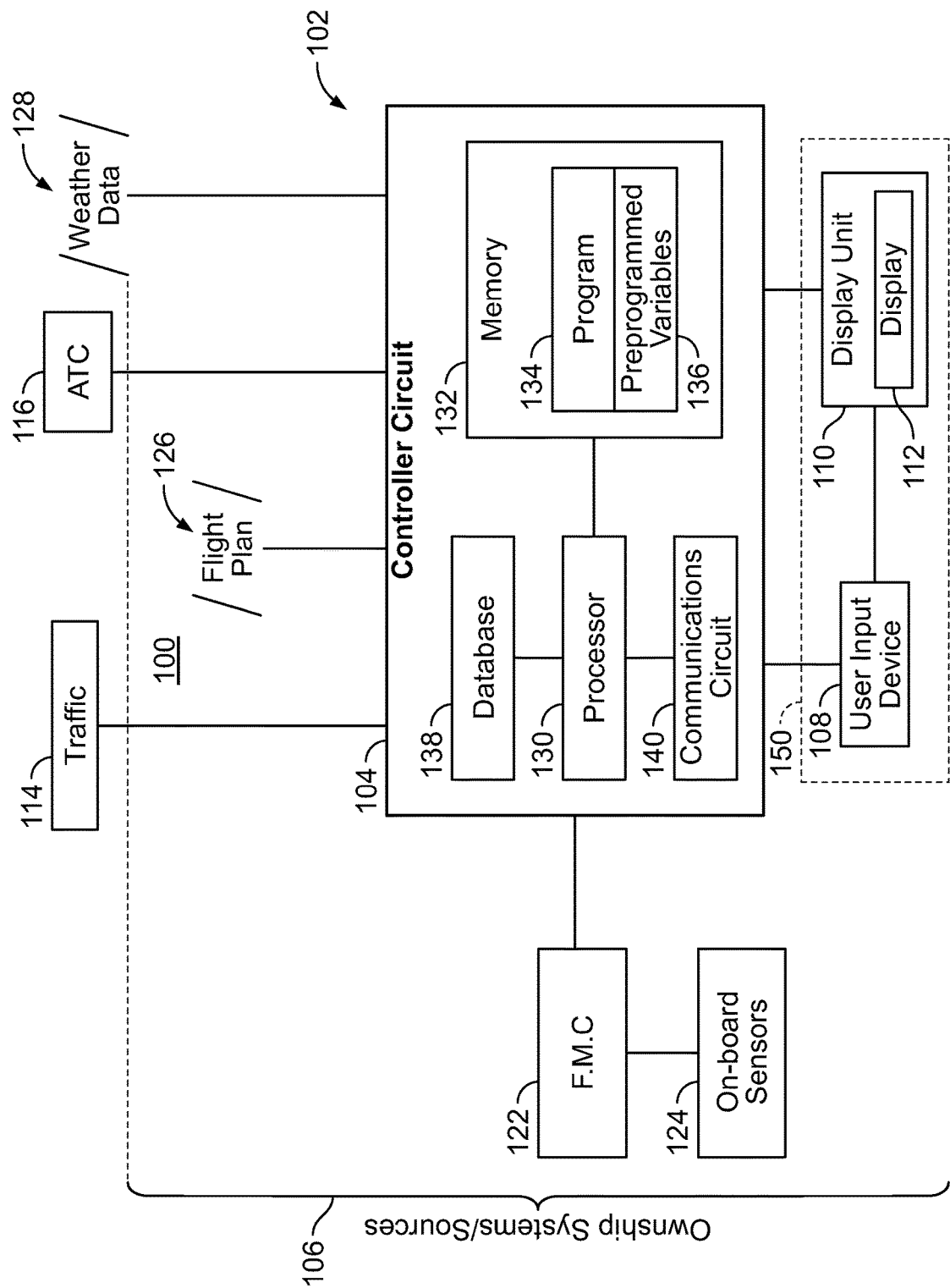
FIG. 1 is a block diagram of a flight display system for providing location information for a user-selected feature on an active vertical situation display (VSD) provided on a display device in a cockpit of an aircraft, as illustrated in accordance with an exemplary embodiment of the present disclosure.

FIG. 1 is a block diagram of a flight display system for providing location information for a user-selected feature on an active vertical situation display (VSD) provided on a display device in a cockpit of an aircraft (shortened hereinafter to "system 102"), as illustrated in accordance with an exemplary and non-limiting embodiment of the present disclosure. The system 102 may be utilized onboard a mobile platform 100 to provide feasible target traffic for a paired approach for the aircraft, as described herein. In various embodiments, the mobile platform is an aircraft 100, which carries or is equipped with the system 102. As schematically depicted in FIG. 1, system 102 may include the following components or subsystems, each of which may assume the form of a single device, system on chip (SOC), or multiple interconnected devices: a controller circuit 104 operationally coupled to: at least one display unit 110; a user input device 108; and ownship systems/data sources 106. In various embodiments, the system 102 may be separate from or integrated within: an FMS computer and/or a flight control system (FCS). The system 102 may also contain a communications circuit 140 with an antenna, configured to wirelessly transmit data to and receive real-time data and signals from various external sources. In various embodiments, the external sources include traffic 114 for providing traffic data, air traffic control (ATC 116) and a weather forecasting source that provides weather data 128. These functional blocks are described in more detail below.

Although schematically illustrated in FIG. 1 as a single unit, the individual elements and components of the system 102 can be implemented in a distributed manner utilizing any practical number of physically distinct and operatively interconnected pieces of hardware or equipment. When the system 102 is utilized as described herein, the various components of the system 102 will typically all be located onboard the Aircraft 100.

The term "controller circuit," as appearing herein, broadly encompasses those components utilized to carry-out or otherwise perform the processes and/or support the processing functionalities of the system 102. Accordingly, controller circuit 104 can encompass or may be associated with a programmable logic array, and an application specific integrated circuit or other similar firmware, as well as any number of individual processors, flight control computers, navigational equipment pieces, computer-readable memories (including or in addition to memory 132), power supplies, storage devices, interface cards, and other standardized components. In various embodiments, as shown in FIG. 1, the controller circuit 104 may embody one or more processors operationally coupled to data storage having stored therein at least one firmware or software program (generally, a program product or program of computer-readable instructions that embody an algorithm) for carrying-out the various process tasks, calculations, and control/display functions described herein. During operation, the controller circuit 104 may execute an algorithm for providing location information for a user-selected feature on an active vertical situation display (VSD), and thereby perform the various process steps, tasks, calculations, and control/display functions described herein. In various embodiments, the algorithm is embodied as at least one firmware or software program (e.g., program 134).

Communications circuit 140 is configured to provide a real-time bidirectional wired and/or wireless data exchange for the processor 130 with the ownship data sources 106, the user input device 108, the display unit 110, and the external sources to support operation of the system 102 in embodiments. In various embodiments, the communications circuit 140 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 140 is integrated within the controller circuit 104 as shown in FIG. 1, and in other embodiments, the communications circuit 140 is external to the controller circuit 104.

A variety of ownship data sources 106 and systems may be operationally coupled to the controller circuit 104. In various embodiments, the ownship data sources 106 includes a flight management controller FMC 122 and on-board sensors 124. In various embodiments, a flight plan (FP 126) may be provided by a flight management system (FMS). On-board sensors 124 include flight parameter sensors and geospatial sensors and supply various types of aircraft state data or measurements to controller circuit 104 during aircraft operation. In various embodiments, the aircraft state data (supplied by the on-board sensors 124) include, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. In various embodiments, the aircraft state data (supplied by the on-board sensors 124) additionally includes on-board sensed weather data associated with the immediate surroundings of the aircraft 100.

External sources may include one or more other aircraft (also referred to as neighbor traffic, or simply, traffic 114), a ground station and/or air traffic control (ATC) 116, and a source of weather data 128. With respect to the present invention, weather data 128 includes meteorological weather information and may be provided by any one or more weather data sources, such as, uplink weather (XM/SXM, GDC/GoDirect Weather), NOTAM/D-NOTAM, TAF, and D-ATIS.

Each traffic 114 of a plurality of traffic 114 encodes and transmits its own state parameters and other identifying information to the aircraft 100 using a traffic communication protocol, such as automatic dependent surveillance broadcast (ADS-B). In various embodiments, controller circuit 104 receives the data from the plurality of traffic 114 and decodes it using the same communication protocol to thereby associate each neighbor traffic 114 with its respective state parameters.

On-board the aircraft 100, a flight management controller (FMC 122) may generate commands, such as speed commands, for an autopilot system. In various embodiments, the controller circuit 104 generates commands for the FMC 122.

In various embodiments, the system 102 may employ one or more database(s) 138; they may be integrated with memory 132 or separate from it. For example, a database 138 may be a source of map layer data that is referenced by the controller circuit 104. Map layer data includes raw geospatial information that locates, in two- or three-dimensions, airport features; geographical (terrain) features; buildings, bridges, and other structures; and maps of streets. In various embodiments, map layer data includes what is referred to as a navigational database. Map layer data may be updated on a periodic or iterative basis to ensure data timeliness. This map layer data may be uploaded into the database 138 at an initialization step and then periodically updated, as directed by either a program 134 update or by an externally triggered update.

In various embodiments, aircraft-specific parameters and information for aircraft 100 may be stored in the database 138 and referenced by the program 134. Non-limiting examples of aircraft-specific information includes an aircraft weight and dimensions, performance capabilities, configuration options, and the like.

During operation, the system 102 can generate various types of lateral and vertical avionic displays 112 on the display unit 110, on which map views and symbology, text annunciations, and other graphics pertaining to flight planning are presented for a pilot to view. As used herein, the term "avionic display" is synonymous with the term "aircraft-related display" and "cockpit display" and encompasses displays generated in textual, graphical, cartographical, and other formats.

Accordingly, the display unit 110 can include any number and type of image generating devices on which one or more avionic displays 112 may be produced. In various embodiments, the display unit 110 is configured to continuously render at least a vertical situation display (VSD). In various embodiments, the display unit 110 is configured to continuously render a VSD and a lateral display showing the Aircraft 100 at its current location, based on aircraft state data and the map layer data.

Specifically, embodiments of avionic displays 112 include one or more two dimensional (2D) avionic displays, such as a horizontal (i.e., lateral) navigation display or vertical situation display; and/or on one or more three dimensional (3D) avionic displays, such as a Primary Flight Display (PFD) or an exocentric 3D avionic display. When the system 102 is utilized for a manned Aircraft, display unit 110 may be affixed to the static structure of the Aircraft cockpit as, for example, a Head Down Display (HDD) or Head Up Display (HUD) unit. Alternatively, display unit 110 may assume the form of a movable display device (e.g., a pilot-worn display device) or a portable display device, such as an Electronic Flight Bag (EFB), a laptop, or a tablet computer carried into the Aircraft cockpit by a pilot. In various embodiments, the avionic display 112 generated and controlled by the system 102 can include a user input interface, including graphical user interface (GUI) objects and alphanumeric displays of the type commonly presented on the screens of MCDUs, as well as Control Display Units (CDUs) generally.

In various embodiments, a user interface (also referred to as a human-machine interface 150) is implemented as an integration of a user input device 108 and a display unit 110, such as, when the display unit 110 includes a touch screen display. In various embodiments, the user interface/human-machine interface 150 includes one or more additional user input devices 108 (such as a keyboard, cursor control device, voice input device, or the like), generally operationally coupled to the display unit 110. Via various display and graphics systems processes, the system 102 may command and control a touch screen display unit 110 to generate, on the human-machine interface 150, a variety of graphical user interface (GUI) objects or elements described herein, including, for example, buttons, sliders, and the like, which are used to prompt a user to interact with the human-machine interface 150 to provide user input; and for the system 102 to activate respective functions and provide user feedback, responsive to received user input at the GUI element.

With continued reference to FIG. 1, in various embodiments, the controller circuit 104 may take the form of an enhanced computer processer and include a processor 130 and a memory 132. Memory 132 is a data storage that can encompass any number and type of storage media suitable for storing computer-readable code or instructions, such as the aforementioned software program 134, as well as other data generally supporting the operation of the system 102. Memory 132 may also store one or more preprogrammed variables 136 and thresholds, for use by an algorithm embodied in the software program 134. Examples of preprogrammed variables 136 include preprogrammed or prescribed amounts of time and distances.

Figure 2:
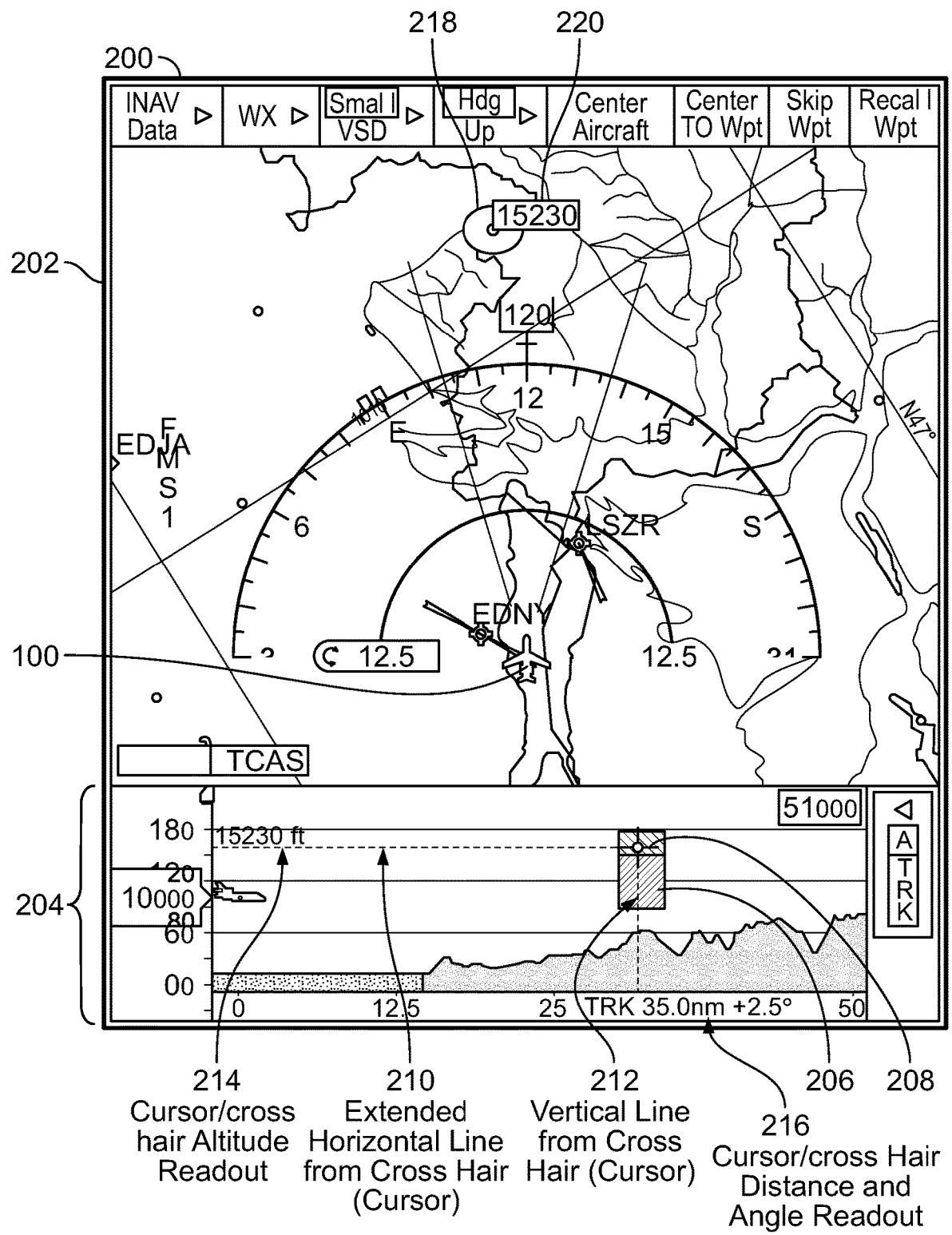
FIGS. 2-3 are illustrations of location information displayed on a display unit, as illustrated in accordance with an exemplary embodiment of the present disclosure.
Figure 3:
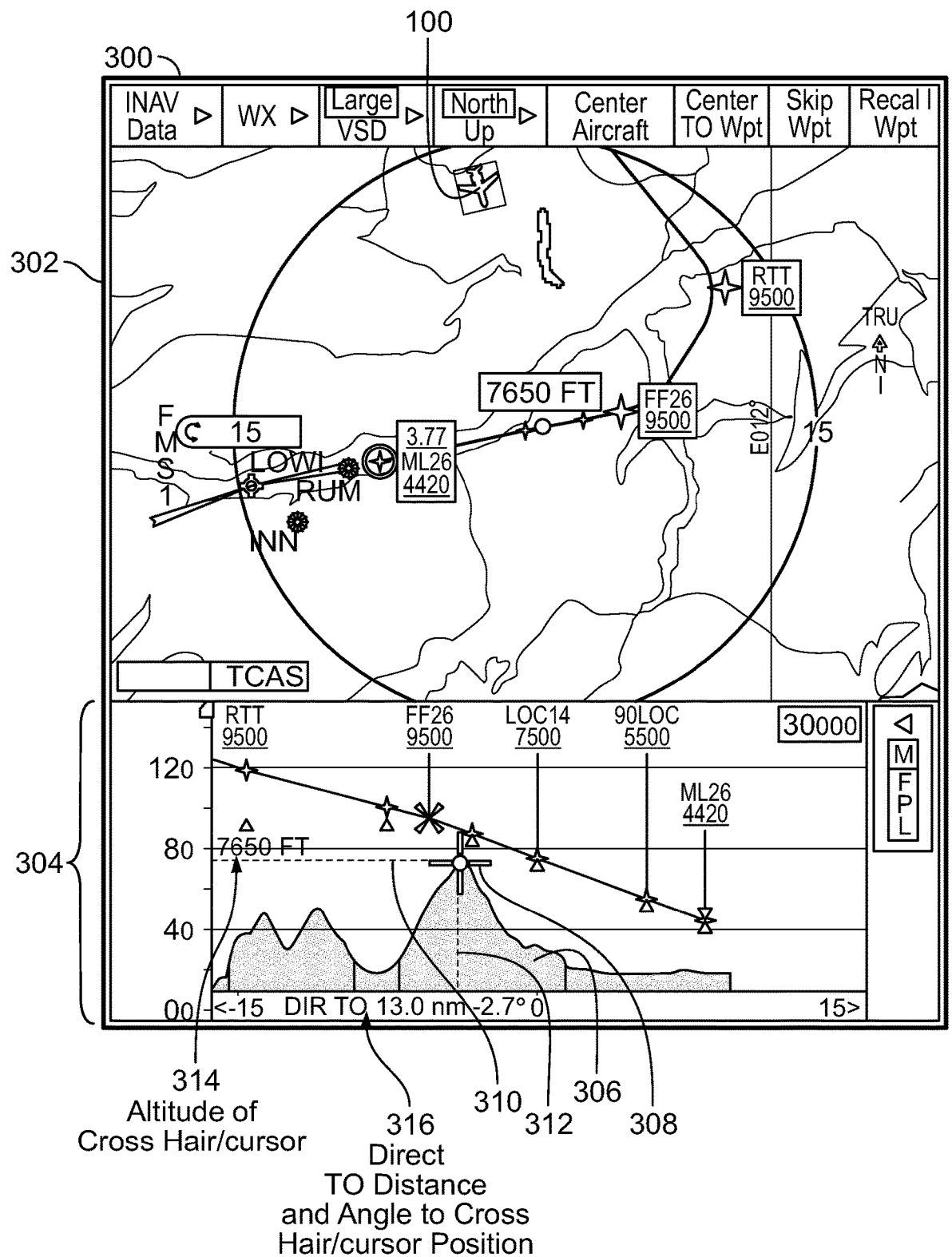

Turning now to FIGS. 2-3, and with continued reference to FIG. 1, the operation of the system 102 is described. Examples in FIGS. 2-3 illustrate providing location information for a user-selected feature on an active vertical situation display (VSD) by the system 102.

Avionic display 200 includes a lateral display 202 and a vertical situation display (VSD) 204. Aircraft 100 is shown on the lateral display 202 and on the VSD 204. The lateral display 202 and VSD 204 are described as active, in that they render an image showing the aircraft 100 at its current location as a function of aircraft state data, map layer data, and weather data.

In the VSD 204, an area 206 is rendered in a visually distinguishable manner to depict a weather event. The visually distinguished area 206 is shown as a rectangle, but in various scenarios it can be a plurality of different shapes and may be amorphous. The visually distinguished area 206 may have multiple shades of one color, or may have multiple colors, as determined by the graphics capacity of the display unit 110. The area 206 is understood to depict a vertical extent of the weather event, along a slice of a horizontal plane. On the lateral display 202, the weather event is also depicted with its lateral extent, as object 218. The pilot may be interested in querying the weather event to find out more specific details as it relates to a current track of the aircraft 100. For example, the pilot may be interested in selecting a single element (or point) in the weather event and finding out, for that point, an altitude, a distance and an angle associated therewith. By enabling the pilot to query the weather event point by point, the pilot is enabled to make more informed decisions and to exercise more options for avoiding severe weather along the pilot's track. For example, the pilot is enabled to avoid the severe weather event by flying above or below it.

At the user interface 150, the user selects a feature from among a plurality of features on the active VSD, the plurality of features including terrain features and weather features. In this example, the user has selected the weather event area 206. In an embodiment, the user selection is performed by moving a cursor over the feature and then indicating the selection to the system by clicking or entering the position. In an embodiment, the user selection is performed by moving a cursor over the feature, without a second step of clicking or entering the position.

In an embodiment, the system 102 causes a reticle 208 to be displayed as an overlay, centered, on the user-selected feature on the active VSD, responsive to receiving the user-selected feature. In an embodiment, the reticle 208 comprises a cross hair. Regardless of the embodiment of the reticle 208, and regardless of whether it is visually depicted, the reticle has a geometric center. The system 102 determines the geometric center of the reticle 208. The system 102 renders a first indicator 210 showing a horizontal extension from the center of the reticle 208 to an intersection on a vertical axis of the active VSD 204. The system 102 also renders a second indicator 212 showing a vertical extension from the center of the reticle 208 to an intersection on a horizontal axis of the active VSD 204. In this manner, the reticle or cross hair is extended horizontally and vertically on the active VSD 204, to thereby obtain an altitude and distance from the aircraft's current location.

The system 102 references map layer data using the center of the reticle 208 to obtain raw geospatial information for the user-selected feature. In this manner, the system 102 queries the map layer data and weather data to find out what is located at this altitude and distance. The system 102 converts the raw geospatial information for the user-selected feature to an elevation (15, 230 feet in the example) and a distance (35 nautical miles in the example) consistent with a current scale of the active VSD. The system 102 positions an alphanumeric elevation label 214 (also referred to as an altitude label, as appropriate for the user-selected feature) along the first indicator 210. The system 102 positions an alphanumeric distance label 216 by the second indicator 212.

In various embodiments, the system 102 also converts the raw geospatial information for the user-selected feature to a vertical angle measured between a horizontal line through an aircraft center of mass in a direction of the aircraft heading and a line from the aircraft center of mass to the center of the reticle. And, the system 102 enhances the alphanumeric distance label 216 with an alphanumeric label for the angle (positive 2.5 degrees in the example) to show that the user-selected feature is not directly on track but is at a vertical angle away at the depicted distance. In various embodiments, the vertical angle is measured between a horizontal line through an aircraft 100 center of mass and a line from the aircraft 100 center of mass to the center of the reticle.

FIG. 3 depicts a user-selected terrain feature. Avionic display 300 includes a lateral display 302 and a vertical situation display (VSD) 304. Aircraft 100 is shown on the lateral display 302. The lateral display 302 and VSD 304 are described as active, in that they render an image showing the aircraft 100 at its current location as a function of aircraft state data, map layer data, and weather data.

In the VSD 304, an area is rendered in a visually distinguishable manner to depict a mountain 306. At the user interface 150, the user selects a feature from among a plurality of features on the active VSD, the plurality of features including terrain features and weather features. In this example, the user has selected the peak of the mountain 306. The system 102 causes a reticle 208 to be displayed as an overlay, centered, on the user-selected feature (mountain 306 peak) on the active VSD 304.

The system 102 determines the geometric center of the reticle 308. The system 102 references map layer data using the center of the reticle 208 to obtain raw geospatial information for the user-selected feature. The system 102 renders a first indicator 310 showing a horizontal extension from the center of the reticle 308 to an intersection on a vertical axis of the active VSD 304. The system 102 also renders a second indicator 312 showing a vertical extension from the center of the reticle 308 to an intersection on a horizontal axis of the active VSD 304. In this manner, the reticle or cross hair is extended horizontally and vertically on the active VSD 304, to thereby obtain an elevation (7650 feet, in this example) and distance (13 nautical miles in this example) from the aircraft's 100 current location.

In various embodiments, in addition to rendering geospatial information on the VSD, the altitude or elevation may be rendered alphanumerically on the lateral display. For example, in FIG. 2, "15,230" is rendered alongside the weather event object 218, and in FIG. 3, "7650 ft" is rendered alongside a dot marking the user-selected peak of mountain, at reticle 308.

Figure 4:
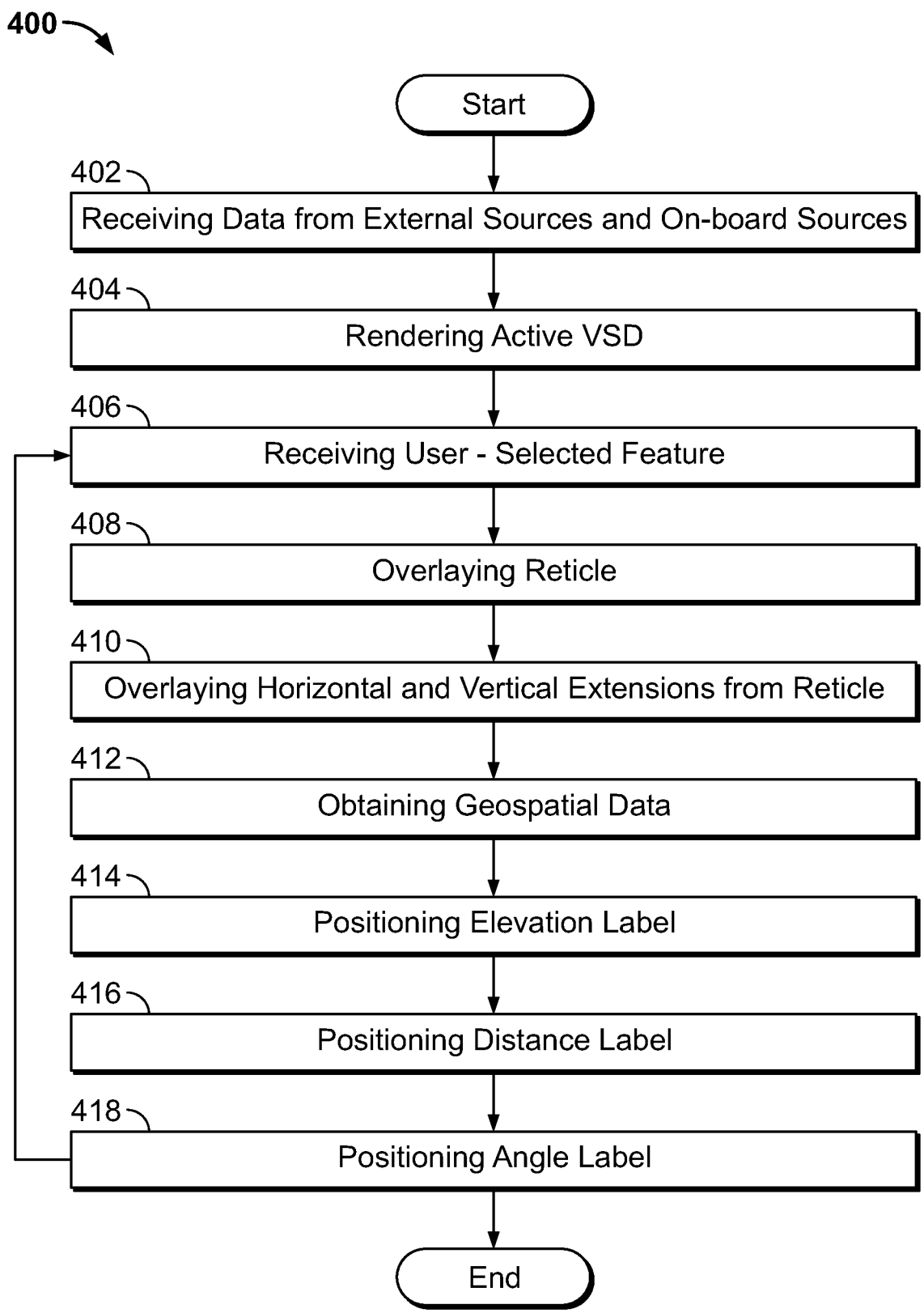
FIG. 4 is a flow chart of a method for providing location information for a user-selected feature on an active vertical situation display (VSD) provided on a display device in a cockpit of an aircraft, as may be implemented by the system of FIG. 1, in accordance with an exemplary embodiment of the present disclosure.

Turning now to FIG. 4, the system 102 described above may be implemented by a processor-executable method 400. For illustrative purposes, the following description of method 400 may refer to elements and modules mentioned above in connection with FIGS. 1-5. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 as long as the intended overall functionality remains intact.

At 402, the system 102 has already been initialized. Initialization may include loading instructions and program 134 into a processor within the controller circuit 104, as well as loading preprogrammed variables 136, map data, weight class specifications, and aircraft-specific features into one or more database(s) 138.

At 402 the system 102 may gather or receive data from external sources, such as weather data, and ATC, and ownship data sources 106. At 404, the active vertical situation display (VSD) having a plurality of features as a function of received aircraft state data, terrain data, and weather data may be rendered. At 406, the system 102 may receive, from a user interface 150, at a controller circuit 104, the user-selected feature from among the plurality of features on the active VSD, the plurality of features including terrain features and weather features. At 408, the system 102 may cause a reticle to be displayed as an overlay, centered, on the user-selected feature on the active VSD, responsive to receiving the user-selected feature. At 410, the system 102 may render a first indicator showing a horizontal extension from a center of the reticle to an intersection on a vertical axis of the active VSD; and, a second indicator showing a vertical extension from the center of the reticle to an intersection on a horizontal axis of the active VSD.

At 412, the system 102 may perform the step of referencing map layer data using the center of the reticle to obtain raw geospatial information for the user-selected feature. At 414, the system 102 may perform the step of converting the raw geospatial information for the user-selected feature to an elevation and a distance consistent with a current scale of the active VSD and position an alphanumeric elevation label along the first indicator. At 416, the system 102 may perform the step of positioning an alphanumeric distance label by the second indicator. And, at 418, the system 102 may perform the step of enhancing the alphanumeric distance label with an alphanumeric angle label. After 418, the method may stop or return to 406.

Thus, enhanced systems and methods for providing location information for a user-selected feature on an active vertical situation display (VSD) provided on a display unit in a cockpit of an aircraft are provided. Embodiments provide an objectively enhanced human-machine interface using a reticle and providing detailed location information for a user-selected feature on the VSD.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program or software application that includes program 134 and preprogrammed variables 136, and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight display system for providing location information for a user-selected feature on an active vertical situation display (VSD) provided on a display unit in a cockpit of an aircraft, the flight display system comprising a controller circuit configured to:
   receive a user selection on the active VSD from a user interface operationally coupled to the controller circuit, the user selection performed by moving a cursor over either a terrain feature or a weather feature from among a plurality of terrain features and weather features displayed on the active VSD;
   cause a reticle to be displayed as an overlay, centered, at the user selection on the active VSD at a current scale of the VSD, responsive to the user selection;
   determine a geometric center of the reticle;
   indicate a location of the user-selected feature by (i) rendering a first indicator showing a horizontal extension from the geometric center of the reticle to an intersection on a vertical axis of the active VSD and (ii) rendering a second indicator showing a vertical extension from the geometric center of the reticle to an intersection on a horizontal axis of the active VSD;
   query map layer data and weather data using the geometric center of the reticle to determine what is located at the user selection, defined as the user-selected feature, and to obtain raw geospatial information for the user-selected feature;
   convert the raw geospatial information for the user-selected feature to an elevation and a distance consistent with the current scale of the active VSD;
   display an alphanumeric elevation label along the first indicator; and
   display an alphanumeric distance label by the second indicator.

2. The flight display system of claim 1, wherein the reticle comprises a cross hairs.

3. The flight display system of claim 1, wherein the controller circuit is further configured to:
- determine that the user-selected feature is not directly on a track of the aircraft but is at a vertical angle away at the distance;
- determine a measurement of the vertical angle; and
- enhance the alphanumeric distance label with the measurement of the angle.

4. A processor-implemented method for providing location information for user-selected features on an active vertical situation display (VSD) provided on a display unit in a cockpit of an aircraft, the method comprising:
- wherein the active vertical situation display (VSD) has displayed thereon a plurality of features determined as a function of received aircraft state data, terrain data, and weather data at a current scale;
- receiving, from a user interface, at a controller circuit, a user selection performed by moving a cursor over a terrain feature or a weather feature from among the plurality of features on the active VSD;
- overlaying a reticle, centered, at the user selection on the active VSD, consistent with the current scale, responsive to receiving the user selection;
- indicating a location of the user selection by (i) rendering a first indicator showing a horizontal extension from a center of the reticle to an intersection on a vertical axis of the active VSD, and (ii) rendering a second indicator showing a vertical extension from the center of the reticle to an intersection on a horizontal axis of the active VSD;
- querying map layer data and weather data using the center of the reticle to determine what is located at the user selection, defined as the user-selected feature, and to obtain raw geospatial information for the user-selected feature;
- converting the raw geospatial information for the user selection to an elevation and a distance consistent with the current scale of the active VSD;
- displaying an alphanumeric elevation label along the first indicator; and
- displaying an alphanumeric distance label by the second indicator.

5. The method of claim 4, further comprising:
- determining that the user selection is not directly on a track of the aircraft but is at a vertical angle away at the distance;
- determining a measurement of the vertical angle; and
- enhancing the alphanumeric distance label with the measurement of the angle.

6. The method of claim 5, wherein the center is a geometric center of the reticle, and further comprising determining the geometric center of the reticle.

7. The method of claim 6, wherein the reticle comprises a cross hairs.

8. A flight display system for providing location information for user-selected features on an active vertical situation display (VSD) provided on a display unit in a cockpit of an aircraft, the flight display system comprising:
- a display unit configured to render the active VSD with a current scale; and
- a controller circuit configured by programming instructions to:
- receive a user selection from a user interface operationally coupled to the controller circuit, the user selection performed by moving a cursor over a terrain feature or a weather feature from among a plurality of features on the active VSD;
- cause a reticle to be displayed as an overlay, centered, on the user-selected feature on the active VSD at the current scale, responsive to receiving the user selection;
- indicate a location of the user selection feature by (i) rendering a first indicator showing a horizontal extension from a center of the reticle to an intersection on a vertical axis of the active VSD and (ii) rendering a second indicator showing a vertical extension from the center of the reticle to an intersection on a horizontal axis of the active VSD;
- query map layer data and weather data using the center of the reticle to determine what is located at the user selection, defined as the user-selected feature, and to obtain raw geospatial information for the user-selected feature;
- convert the raw geospatial information for the user-selected feature to an elevation and a distance consistent with the current scale of the active VSD;
- display an alphanumeric elevation label along the first indicator; and
- display an alphanumeric distance label by the second indicator.

9. The flight display system of claim 8, wherein the reticle comprises a cross hairs.

10. The flight display system of claim 9, wherein the center is a geometric center of the reticle, and wherein the controller circuit is further configured to determine the geometric center of the reticle.

11. The flight display system of claim 10, wherein the controller circuit is further configured to:
- determine that the user-selected terrain feature or weather feature is not directly on a track of the aircraft but is at a vertical angle away at the distance;
- determine a measurement of the vertical angle; and
- enhance the alphanumeric distance label with the measurement of the angle.

* * * * *